(12) United States Patent
Watson

(10) Patent No.: US 10,074,999 B2
(45) Date of Patent: Sep. 11, 2018

(54) PORTABLE CHARGING SYSTEM

(71) Applicant: Valencia Watson, Knoxville, TN (US)

(72) Inventor: Valencia Watson, Knoxville, TN (US)

( * ) Notice: Subject to any disclaimer, the term of this patent is extended or adjusted under 35 U.S.C. 154(b) by 35 days.

(21) Appl. No.: 15/278,233

(22) Filed: Sep. 28, 2016

(65) Prior Publication Data

US 2018/0090951 A1 Mar. 29, 2018

(51) Int. Cl.
| | |
|---|---|
| *H02J 7/00* | (2006.01) |
| *A45C 5/03* | (2006.01) |
| *A45C 5/06* | (2006.01) |
| *A45C 5/14* | (2006.01) |
| *A45C 13/10* | (2006.01) |
| *A45C 13/26* | (2006.01) |

(52) U.S. Cl.
CPC .............. *H02J 7/0027* (2013.01); *A45C 5/03* (2013.01); *A45C 5/06* (2013.01); *A45C 5/14* (2013.01); *A45C 13/103* (2013.01); *A45C 13/262* (2013.01); *H02J 7/0045* (2013.01)

(58) Field of Classification Search
CPC ........ H02J 7/008; H02J 7/0011; H02J 7/0027; H02J 7/0054; H02J 7/0042; H02J 7/0045
USPC ............................................................. 320/107
See application file for complete search history.

(56) References Cited

U.S. PATENT DOCUMENTS

| | | |
|---|---|---|
| D380,298 S | 7/1997 | Ferris |
| 6,894,457 B2 | 5/2005 | Germagian et al. |
| 8,593,108 B2 | 11/2013 | Ferber et al. |
| 8,890,478 B2 | 11/2014 | Matthias et al. |
| 2007/0018817 A1 | 1/2007 | Marmaropoulos et al. |
| 2010/0231161 A1 | 9/2010 | Brown |
| 2013/0248309 A1 | 9/2013 | Lein et al. |
| 2015/0027836 A1* | 1/2015 | Zhou .................. A45C 9/00 190/12 A |
| 2016/0141904 A1* | 5/2016 | Zhijian .............. H02J 7/0054 320/103 |
| 2017/0127783 A1* | 5/2017 | Korey .................. A45C 5/03 |
| 2017/0220040 A1* | 8/2017 | London ............ G05D 1/0016 |
| 2017/0290401 A1* | 10/2017 | Bhatnagar .......... A45C 15/00 |

* cited by examiner

*Primary Examiner* — Paul Dinh

(57) ABSTRACT

A portable charging system includes a piece of baggage that has at least one outer pocket. A charging unit is provided and the charging unit is coupled to the piece of baggage. At least one electronic device is selectively electrically coupled to the charging unit to charge the electronic device.

5 Claims, 5 Drawing Sheets

PORTABLE CHARGING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to charging devices and more particularly pertains to a new charging device for charging electronic devices while travelling.

BRIEF SUMMARY OF THE INVENTION

An embodiment of the disclosure meets the needs presented above by generally comprising a piece of baggage such as a suitcase that has at least one outer pocket. A charging unit is provided and the charging unit is coupled to the suitcase. At least one electronic device is selectively electrically coupled to the charging unit. Thus, the charging unit charges the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
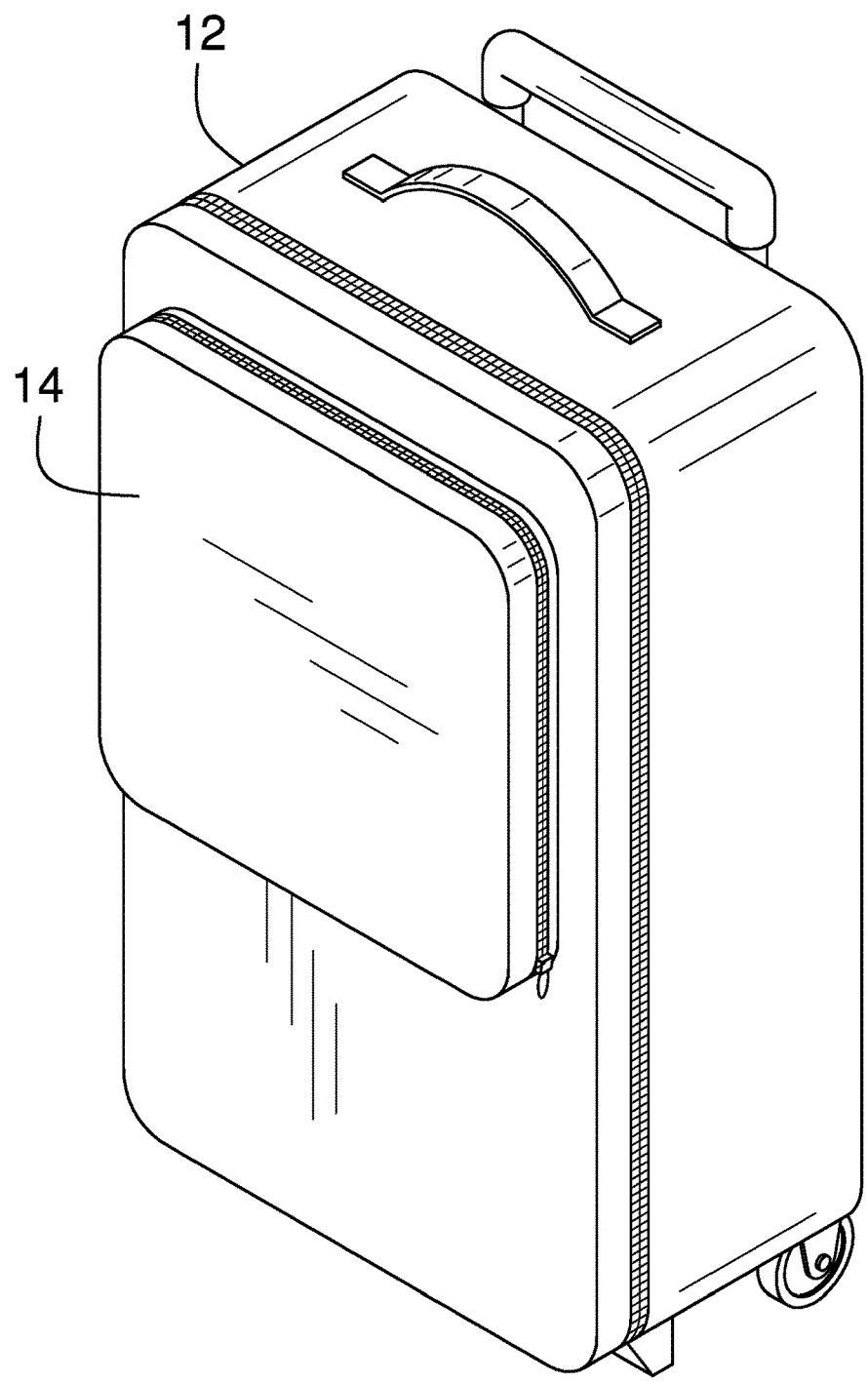
FIG. 1 is a front perspective view of a portable charging system according to an embodiment of the disclosure.
Figure 2:
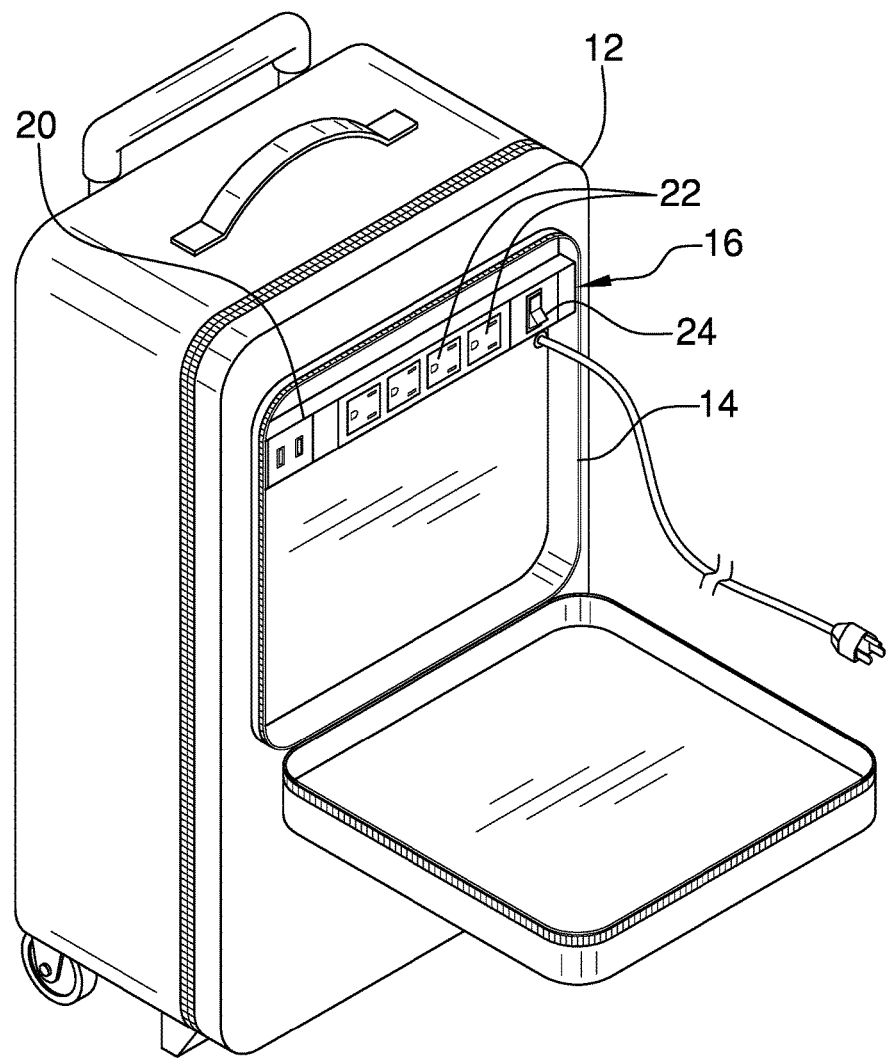
FIG. 2 is a perspective view of a charging unit of an embodiment of the disclosure.
Figure 3:
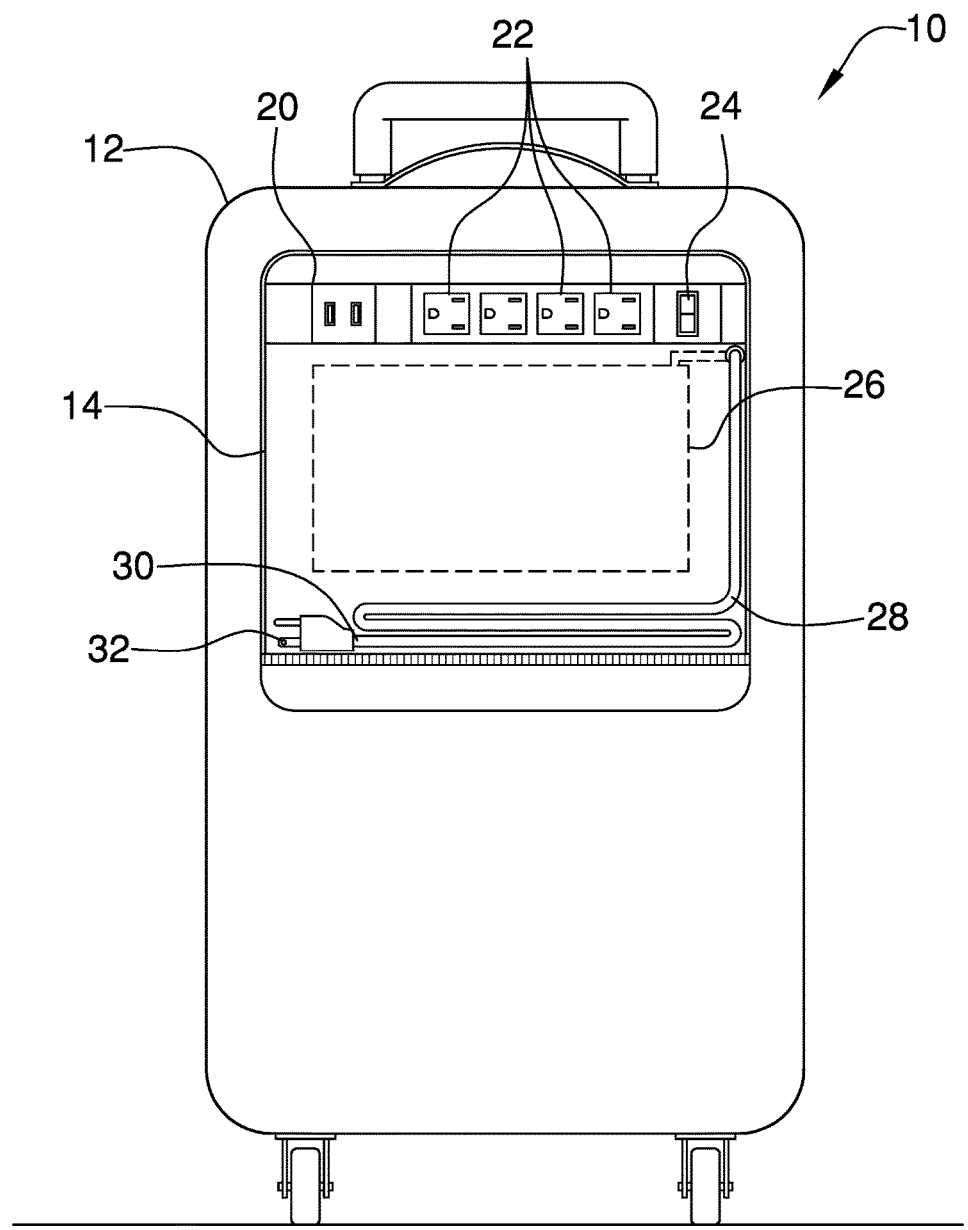
FIG. 3 is a front view of an embodiment of the disclosure.
Figure 4:
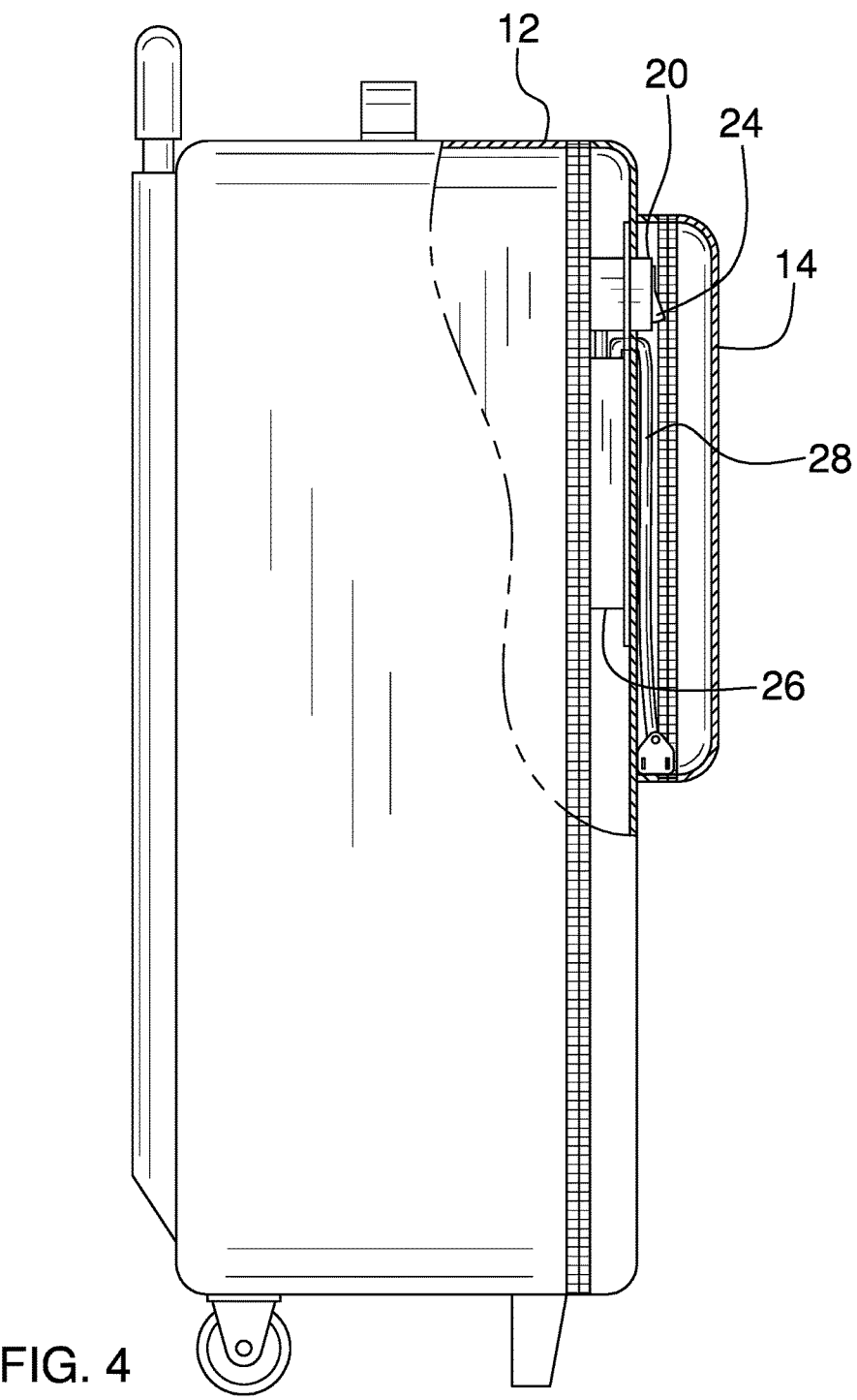
FIG. 4 is a right side cut-away view of an embodiment of the disclosure.
Figure 5:
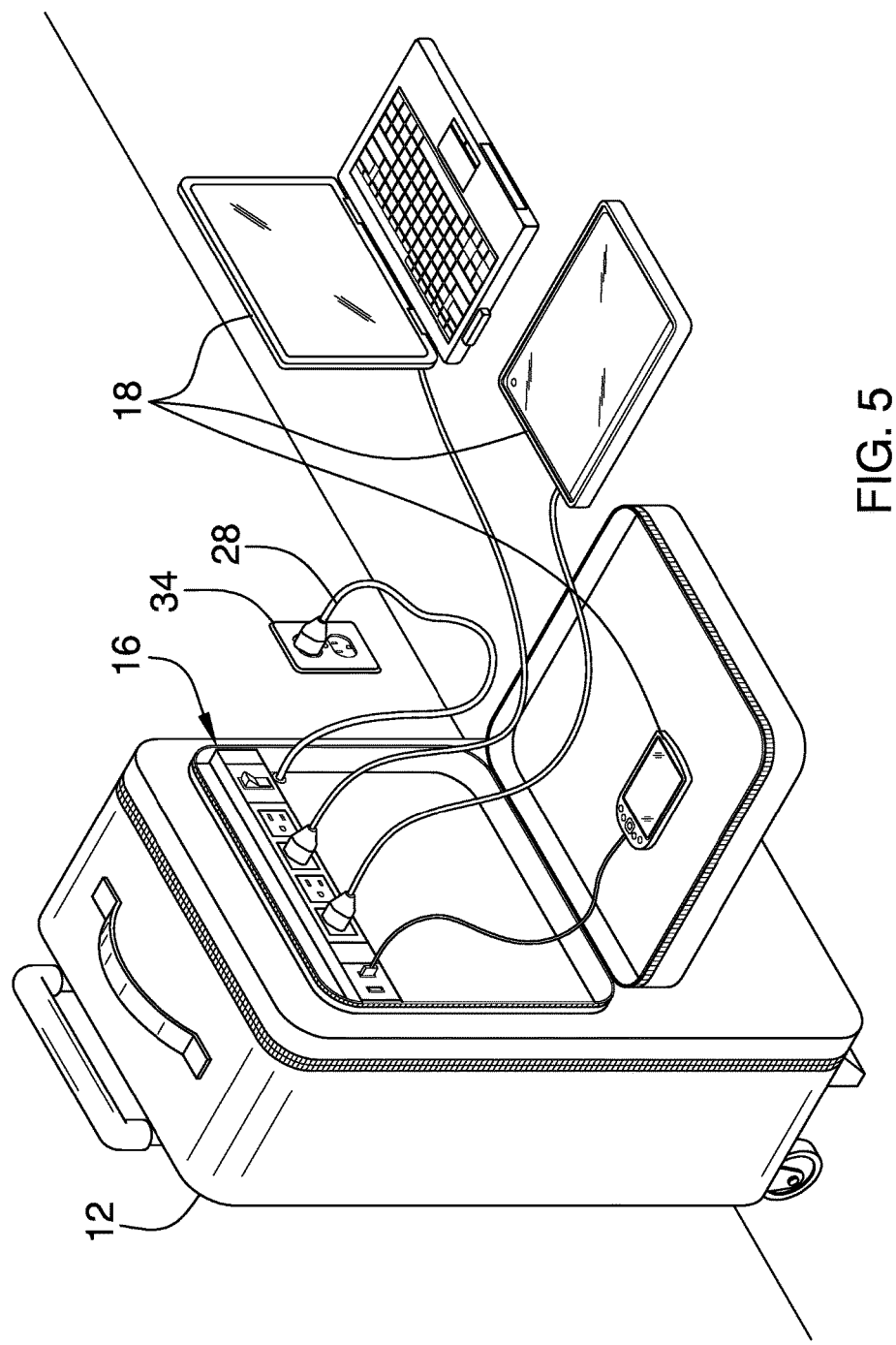
FIG. 5 is a perspective in-use view of an embodiment of the disclosure.

With reference now to the drawings, and in particular to FIGS. 1 through 5 thereof, a new charging device embodying the principles and concepts of an embodiment of the disclosure and generally designated by the reference numeral 10 will be described.

As best illustrated in FIGS. 1 through 5, the portable charging system 10 generally comprises baggage such as a suitcase 12, knapsack, backpack, or the like, that has at least one outer pocket 14. A charging unit 16 is provided and the charging unit 16 is coupled to the suitcase 12. At least one electronic device 18 may be electrically coupled to the charging unit 16. Thus, the charging unit 16 charges the at least one electronic device 18. The at least one electronic device 18 may be a smart phone, a laptop computer or other similar device.

The charging unit 16 comprises a power strip 20 that is coupled to the suitcase 12. The power strip 20 is positioned within the at least one outer pocket 14. The power strip 20 includes a plurality of outlets 22. Each of the outlets 22 may have the at least one electronic device 18 electrically coupled thereto. Each of the outlets 22 may comprise a three prong female electrical outlet. Moreover, a portion of the outlets 22 may comprise a usb port or the like.

A switch 24 is provided. The switch 24 is coupled to the power strip 20 and the switch 24 may be manipulated. The switch 24 is electrically coupled to each of the outlets 22. Thus, the switch 24 turns each of the outlets 22 on and off.

A battery 26 is provided and the battery 26 is coupled to the suitcase 12. The battery 26 is positioned within the suitcase 12. The battery 26 is electrically coupled to each of the outlets 22. Thus, the battery 26 may charge the at least one electronic device 18. The battery 26 may be a four thousand mAh battery 26 or the like.

A power cord 28 is coupled to and extends outwardly from the suitcase 12. The power cord 28 is electrically coupled to the battery 26. The power cord 28 has a distal end 30 with respect to the suitcase 12. A plug 32 is electrically coupled to the distal end 30. The plug 32 may be electrically coupled to a power source 34 thereby facilitating the battery 26 to be charged. The power source 34 may be an electrical outlet or the like.

In use, the suitcase 12 is employed for travel purposes. The at least one electronic device 18 is selectively plugged into the power strip 20. Thus, the at least one electronic device 18 may be charged in an airport or other location where electrical outlets 22 are not available. The charging unit 16 facilitates the at least one electronic device 18 to be charged during travel. The power cord 28 is electrically coupled to the power source 34 when the battery 26 needs to be charged.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable charging system comprising:
   a suitcase having an outer pocket, said outer pocket having a rectangular shape; and
   a charging unit being coupled to said suitcase wherein said charging unit is configured to have at least one electronic device being electrically coupled thereto thereby facilitating said charging unit to charge the electronic device, said charging unit including a power strip being coupled to said suitcase, said power strip being elongated, said power strip being positioned within said outer pocket and extending along a top edge of said rectangular shape wherein a portion of said outer pocket extends downwardly from said power strip wherein said outer pocket is configured to hold the at least one electronic device while the at least one electronic device is being charged, said power strip including a plurality of outlets aligned along a length of said power strip, each of said outlets being configured to have the at least one electronic device being electrically coupled thereto.

2. The system according to claim 1, further comprising a switch being coupled to said power strip, said switch being electrically coupled to each of said outlets such that said switch turns each of said outlets on and off.

3. The system according to claim 1, further comprising a battery being coupled to said suitcase, said battery being positioned within said suitcase, said battery being electrically coupled to each of said outlets wherein said battery is configured to charge the at least one electronic device.

4. The system according to claim 3, further comprising a power cord being coupled to and extending outwardly from said suitcase, said power cord being electrically coupled to said battery, said power cord having a distal end with respect to said suitcase, said distal end having a plug being electrically coupled thereto, said plug being configured to be electrically coupled to a power source thereby facilitating said battery to be charged.

5. A portable charging system comprising:
   a suitcase having an outer pocket, said outer pocket having a rectangular shape; and
   a charging unit being coupled to said suitcase wherein said charging unit is configured to have at least one electronic device being electrically coupled thereto thereby facilitating said charging unit to charge the electronic device, said charging unit comprising:
   a power strip being coupled to said suitcase, said power strip being elongated, said power strip being positioned within said outer pocket and extending along a top edge of said rectangular shape wherein a portion of said outer pocket extends downwardly from said power strip wherein said outer pocket is configured to hold the at least one electronic device while the at least one electronic device is being charged, said power strip including a plurality of outlets aligned along a length of said power strip, each of said outlets being configured to have the at least one electronic device being electrically coupled thereto,
   a switch being coupled to said power strip, said switch being electrically coupled to each of said outlets such that said switch turns each of said outlets on and off,
   a battery being coupled to said suitcase, said battery being positioned within said suitcase, said battery being electrically coupled to each of said outlets wherein said battery is configured to charge the at least one electronic device, and
   a power cord being coupled to and extending outwardly from said suitcase, said power cord being electrically coupled to said battery, said power cord having a distal end with respect to said suitcase, said distal end having a plug being electrically coupled thereto, said plug being configured to be electrically coupled to a power source thereby facilitating said battery to be charged.

\* \* \* \* \*